United States Patent
Kundapur et al.

(10) Patent No.: US 11,836,153 B1
(45) Date of Patent: Dec. 5, 2023

(54) BIDIRECTIONAL HIGH-VOLUME DATA SYNCHRONIZATION BETWEEN INTELLIGENT PLATFORM AND REMOTE SYSTEM WITH MINIMAL LATENCY

(71) Applicant: EIGHTFOLD AI INC., Santa Clara, CA (US)

(72) Inventors: Niran Kundapur, Fremont, CA (US); Sivasankaran Chandrasekar, Santa Clara, CA (US)

(*) Notice: Subject to any disclaimer, the term of this patent is extended or adjusted under 35 U.S.C. 154(b) by 0 days.

(21) Appl. No.: 17/837,809

(22) Filed: Jun. 10, 2022

Related U.S. Application Data

(60) Provisional application No. 63/210,130, filed on Jun. 14, 2021.

(51) Int. Cl.
  *G06F 15/16* (2006.01)
  *G06F 16/27* (2019.01)
  *H04L 67/1095* (2022.01)
  *G06F 16/23* (2019.01)

(52) U.S. Cl.
  CPC .......... *G06F 16/27* (2019.01); *G06F 16/2365* (2019.01); *H04L 67/1095* (2013.01)

(58) Field of Classification Search
  None
  See application file for complete search history.

(56) References Cited

U.S. PATENT DOCUMENTS

| | | | |
|---|---|---|---|
| 2013/0046799 A1* | 2/2013 | Hale | G06F 16/211 707/805 |
| 2013/0212067 A1* | 8/2013 | Piasecki | G06F 16/1787 707/620 |
| 2014/0289190 A1* | 9/2014 | Chan | G06F 8/44 707/610 |
| 2017/0206148 A1* | 7/2017 | Mehta | G06F 11/2094 |
| 2017/0351585 A1* | 12/2017 | Bourbonnais | G06F 16/27 |
| 2018/0060180 A1* | 3/2018 | Tan | G06F 16/113 |
| 2018/0165317 A1* | 6/2018 | Yair | G06F 16/219 |
| 2018/0329969 A1* | 11/2018 | Abrams | G06F 16/951 |
| 2019/0325064 A1* | 10/2019 | Mathiesen | G06F 16/35 |
| 2022/0269703 A1* | 8/2022 | Gentilcore | G06F 16/24578 |

* cited by examiner

*Primary Examiner* — Alex Gofman
(74) *Attorney, Agent, or Firm* — Zhong Law LLC

(57) ABSTRACT

A system and method include processing devices to implement an automated synchronization system for an intelligent talent platform, the automated synchronization system including one or more remote system adapters each coupled to a corresponding remote system, to retrieve one or more first data objects containing information relating to managing talents, a synchronization handler to obtain, based on identification features of the one or more first data objects, one or more second data objects from a storage device associated with the intelligent talent platform, calculate a consistency score based on values in the one or more first data objects and values in the one or more second data objects, and responsive to determining that the one or more first data objects comprise modifications from the one or more second data objects based on the consistency score, determine priority values associated with the modifications to the one or more first data objects.

19 Claims, 7 Drawing Sheets

BIDIRECTIONAL HIGH-VOLUME DATA SYNCHRONIZATION BETWEEN INTELLIGENT PLATFORM AND REMOTE SYSTEM WITH MINIMAL LATENCY

REFERENCE TO RELATED APPLICATIONS

This application claims priority benefit to U.S. Provisional Application No. 63/210,130 filed on Jun. 14, 2021.

TECHNICAL FIELD

The present disclosure relates to system and method for data storages in multiple systems and data synchronization among the same, and in particular to a system, method, and storage medium including executable computer programs for bidirectional high-volume data synchronization between intelligent platform and remote system with minimal latency.

BACKGROUND

An organization such as a company may need to hire talents in the job market to fill job openings. The organization may use multiple information systems to assist the hiring candidates and also manage employees. The information systems may include systems for recruiting, applicant tracking, and employee management.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
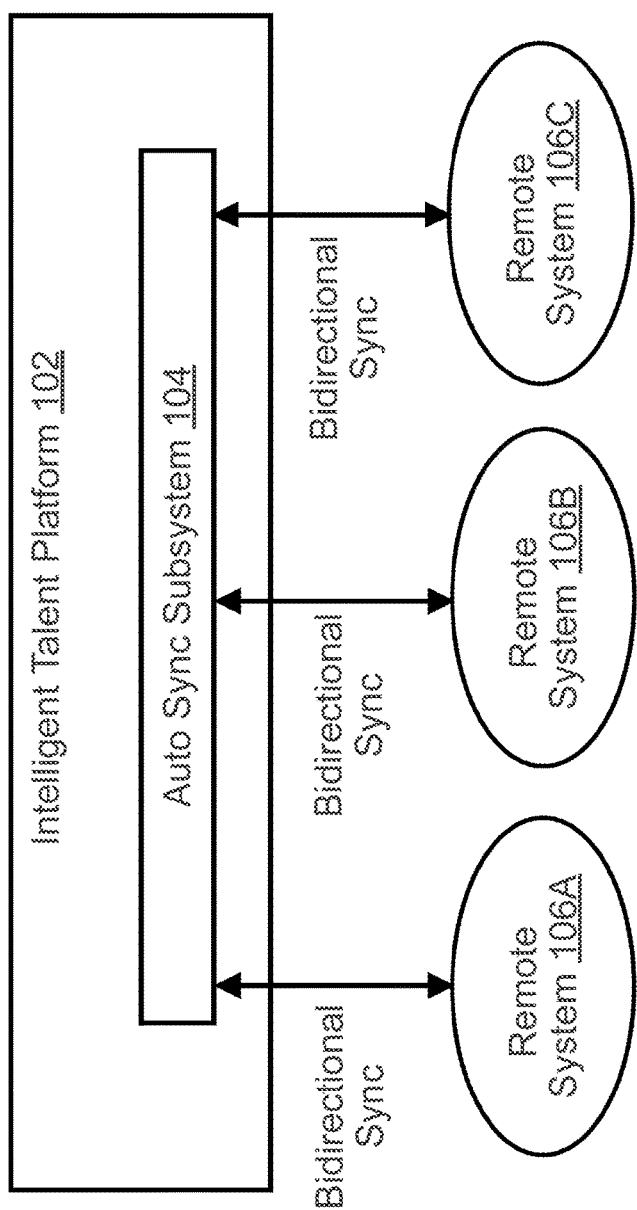
FIG. 1 illustrates an enterprise HR computing system according to an implementation of the disclosure.

Recruiters of the organization (e.g., human resource (HR) managers) may use these information systems to perform functions relating to sourcing, assessing, and recruiting qualified individuals (collectively referred to as "talents") inside and outside the organization. Two of the standard systems often used are the Applicant Tracking System (ATS) and the Human Resource Information Systems (HRIS). In addition to HRIS and ATS, there are other types of HR systems used by HR managers. These standard systems may have been purchased by the organization and installed on premise of the organization. Alternatively, these standard systems may be subscribed by the organization in the form of software as a service (SaaS). The systems offer an Application Programming Interface (API). In addition to these discrete standard information systems, the recruiters may also use an intelligent talent platform that is communicatively connected (e.g., via a communication network) to these standard information systems deployed by organizations using the standard system API. The intelligent talent platform may be operated by a third-party talent management company to provide analytical results to the organization based large data, where the intelligent talent platform may retrieve the large data from the diverse standard information systems such as ATS and HRIS.

The intelligent talent platform may provide the recruiters with valuable insights including, but not limited to, quantitative metrics or the matching scores to match candidates and positions, highlights on candidate profiles, diversity analytics for diversity hiring goals, organization-wide skill and capability analytics for workforce planning, and talent analytics for recruiting operational excellence. The intelligent talent platform may provide the recruiters with useful functionalities such as job role library, leads to top prospective candidates, campaigns to contact the top prospective candidates, personalized career site (PCS) for candidates to apply for jobs, and large-scale screening tool for screening a large number of applicants.

The intelligent talent platform deployed by an organization may use a data system to store data relating to the candidates, jobs, and employees. Correspondingly, each of the standard systems may be a remote system that may store their copies of data that are related to the data stored in the intelligent talent platform. The data may be stored in the form of data objects in a database of the remote system. The data objects can be data entries in the database, the data entries including descriptions of job positions in the ATS, candidates for these job positions which could be inside or outside the organization, and candidates' application files. The recruiters may have accesses to the intelligent talent platform and the ATS, and the employees of the organization may have accesses to the intelligent talent platform and the HRIS.

The data objects stored in the information systems used by the organization and in the intelligent talent platform may be updated at each of the information systems or at the intelligent talent platform from time to time. Further, the data objects stored in the information systems and the intelligent talent platform may be related in the sense that the data object in one system may have been derived from another data object in another system. To ensure the data consistency among related data objects stored at different information systems, there are needs to automatically synchronize these related data objects bidirectionally between the intelligent talent platform and the information systems of the customer organizations (referred to hereinafter as the remote systems). The synchronization needs to be performed at large scale with little to no human user intervention.

In particular, the synchronization between the remote systems and the intelligent talent platform may include synchronization of data objects, the metadata associated with the data object, and the fields within the data objects in the intelligent talent platform and the remote systems. The synchronization needs to be complete (or containing the same set of data fields in both the intelligent talent platform and the remote systems), consistent (or containing the same values for the data fields in both the intelligent talent platform and the remote systems), and fresh (changes to data in one system being reflected in the other system with minimum delay).

A synchronization subsystem that is responsible for synchronizing data between the intelligent talent system and the remote system may be further required to be capable of handling large quantities of data at scale with high throughput because large companies may have several million candidate profiles and tens of thousands of open and closed positions, capable of synchronizing only the data that have been changed and minimizing the number of synchronization attempts to achieve efficiency, and capable of gracefully handling errors raised by the remote system to achieve robustness.

Current enterprise HR software systems are limited in their functions for synchronizing data between the intelligent talent system and the remote systems. For example, current job boards obtain open positions from ATS and display the opening positions on websites even if the opening position data are incomplete or delayed to the job boards. Further, the number of open positions are typically a few hundreds to a few thousands for an enterprise, and the job boards of the enterprise may not treat the throughput and efficiency as critical factors in synchronization. Talent sourcing tools enter new prospective leads into the remote systems but rarely synchronize the data housed in the remote systems with the intelligent talent system because the talent sourcing tools usually do not need to read the data housed in the remote systems. Workflow tools such as tools for candidate assessments, email & text communication, and e-signature may be high throughput but may not need complete or fresh data. Therefore, to overcome the above-identified and other deficiencies, there is a need for a synchronization subsystem that is capable of achieving complete, consistent, and fresh data synchronization.

Implementations of the disclosure may provide an intelligent talent platform including a synchronization subsystem that is configured to automatically synchronize data bidirectionally between the intelligent talent platform and a variety of remote talent systems at scale with little to no human intervention while achieving completeness, consistency, freshness in the system and scale/high throughput, efficient, and robust data handling.

Implementations of the synchronization subsystem include components that may help achieve the synchronization requirements. To achieve the completeness of the data synchronization (or both the intelligent talent system and the remote systems containing the identical set of data fields), the synchronization subsystem may provide an extensible data model that is a superset of the data models used in the remote systems and the data model used in the intelligent talent system. In addition to common fields among different data models, the extensible data model may include custom fields of different data models and mappings between custom fields that are related but represented in different formats in different data models. Implementations may also provide the extensible data model with data transformation macros library, where a macro refers to a single instruction that expands automatically into a set of instructions to perform the mapping or transformation from a first custom field of a first data model to a second custom field of a second data model.

To achieve the consistency of the data synchronization (or both the intelligent talent system and the remote system containing the same value for the same data fields in both systems), the synchronization subsystem may be implemented as an automated synchronization system that may include a synchronization handler for processing synchronization tasks and a merge logic for merging newest versions of data objects stored in the remote systems and in the intelligent talent platform. The automated synchronization system may detect data inconsistencies and anomalies between the intelligent talent platform and the remote systems, and in response to the detection, automatically update the data objects to make them consistent between the intelligent talent system and the remote systems. Further, the automated synchronization system may generate smart alerts to users (e.g., HR managers) in response to detecting certain anomalies between the intelligent talent platform and the remote systems. The automated synchronization system may perform actions based on instructions received from the user.

To achieve the freshness of the data synchronization (or changes to data in one system being reflected in the other system with a minimal delay), the automated synchronization system may include a smart scheduler and notification. The scheduler may automate the synchronization of data based on the types of the remote systems and data models. The automated synchronization system may include a webhook notification that may generate a notification to the intelligent talent system whenever there is an update to the data objects in the remote systems, and a writeback procedure to write the updated data objects to the intelligent talent system in bulk.

To achieve scalability and high throughput in synchronization (or capable of handling large quantities of data), the automated synchronization system may provide an auto provisioning architecture that may include a scalable structure with auto provision queues and schedules.

To achieve a high efficiency in synchronization (or capable of synchronizing only the data that have been changed and minimizing the number of synchronization attempts), the automated synchronization system may be configured with adaptive synchronization including precision synchronization learning, volume and data rate caps, and auto shutoff according to rules.

To achieve the robustness in synchronization (or capable of gracefully handling errors raised by the remote system), the automated synchronization system may be configured with automated robustness protection including automated probes for detecting connectivity and permission, semantic understanding of common issues and implication of use cases (e.g., scheduled downtimes, permissions, workflow changes, rate limits), validation rules, and recovery actions enabled with key tools for user when needed.

FIG. 1 illustrates an enterprise HR computing system 100 according to an implementation of the disclosure. As discussed above, an enterprise (e.g., a large company with a large number of employees and job candidates applying for job openings) may use an intelligent talent platform 102 to manage talents (candidates and/or employees). Enterprise HR computing system 100 can be a computing system including computer processors and storage devices. Alternatively, enterprise HR computing system 100 can be implemented in a computing cloud such as a public cloud, a private cloud, or a hybrid cloud. Intelligent talent platform 102 may employ a suite of software applications running on enterprise HR computing system 100. The suite of software applications may include machine learning or neural network modules that may provide valuable insights into the talent data, the valuable insights including, but not limited to, quantitative metrics or the matching scores to match candidates and positions, highlights on candidate profiles, diversity analytics for diversity hiring goals, organization-wide skill and capability analytics for workforce planning, and talent analytics for recruiting operational excellence.

Intelligent talent platform 102 may acquire the talent data from remote systems 106A-106C which can be standard systems that provide different types of talent data. Examples of standard systems may include the Applicant Tracking System (ATS) and the Human Resource Information Systems (HRIS). These standard systems may have been purchased by the organization and/or installed on premise of the organization. Alternatively, these standard systems may be subscribed by the organization in the form of software as a service (SaaS). Additionally, intelligent talent platform 102 may obtain talent data from different vendors. For example, intelligent talent platform 102 may obtain a first portion of the talent data from a first remote system 106A and obtain a second portion of the talent data from a second remote system 106B. Intelligent talent platform 102 may update the talent data stored in the enterprise HR computing system. Correspondingly, remote systems 106A-106C may also be updated from time to time (e.g., talent profiles of new applicants are entered into the ATS). These updates may create discrepancies between the talent data stored in intelligent talent platform 102 and the data stored in remote systems 106A-106C. To eliminate the discrepancies between the talent data stored in intelligent talent platform 102 and the data stored in remote systems 106A-106C, implementations of the disclosure provide an automated synchronization subsystem 104 in intelligent talent platform 102. Automated synchronization subsystem 104 may include components to perform bidirectional high-volume data synchronization between intelligent talent platform 102 and remote systems 106A-106C.

Figure 2:
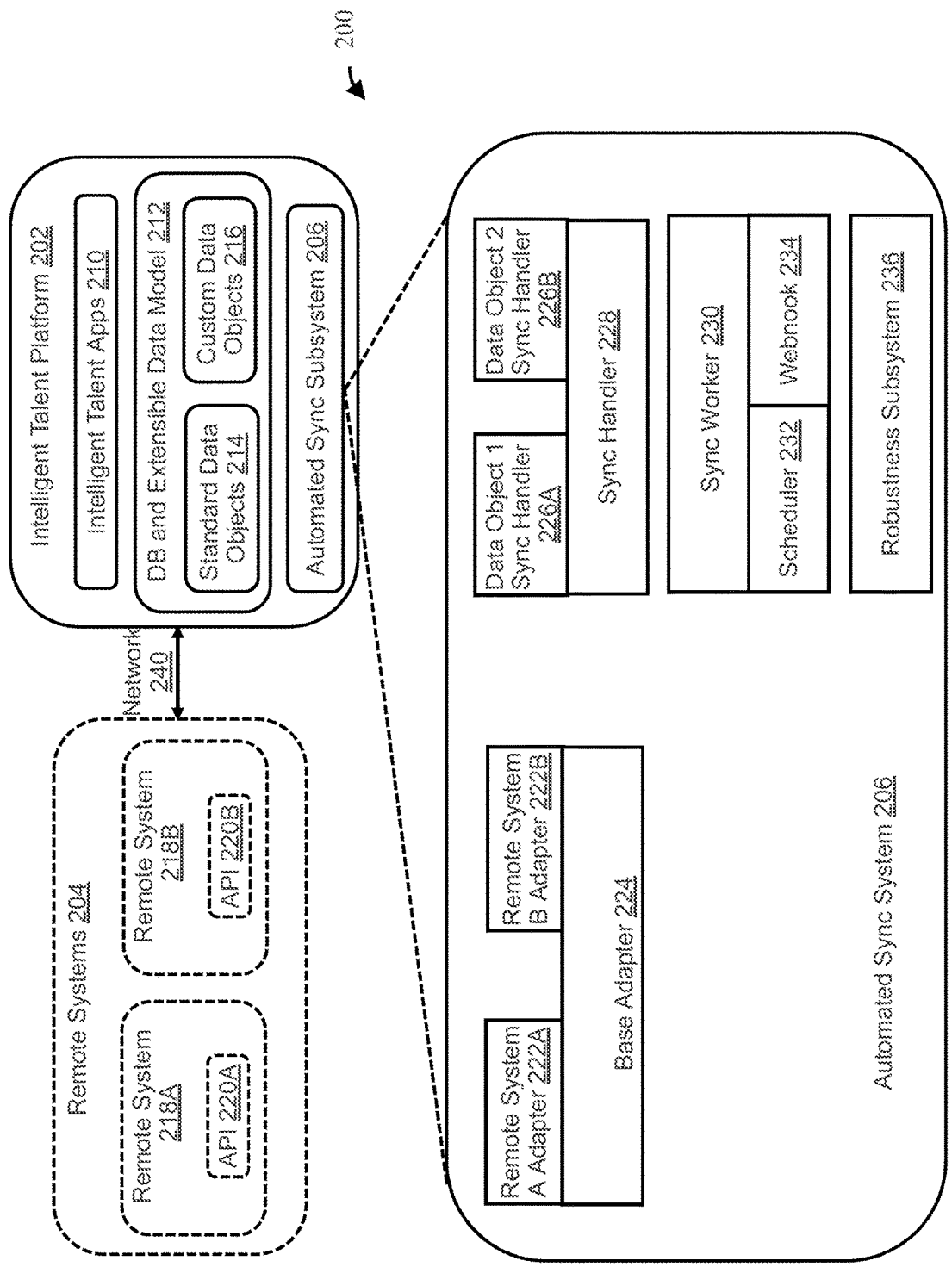
FIG. 2 illustrates an enterprise HR computing system with data synchronization according to an implementation of the disclosure.

FIG. 2 illustrates an enterprise HR computing system 200 with data synchronization according to an implementation of the disclosure. Referring to FIG. 2, enterprise HR computing system 200 may include an intelligent talent platform 202 and remote systems 204 that are connected to the intelligent talent platform 202 through a communication network 240. Remote systems 206 may be composed of one or more individual remote system 218A-218B. Each remote system 218A-218B may be provided by a vendor to serve a certain HR function. Examples of remote system 218A-218B may include the Applicant Tracking System (ATS) for managing the application process of candidates and the Human Resource Information Systems (HRIS) for managing the career cycle of employees. Remote system 218A-218B may store the information of candidates or employees (collectively referred to as talents) as data objects in entries of their respective databases. To communicate with the intelligent talent platform 202 and other remote systems, each remote system may provide an application programming interface (API) 220A-220B that enables the intelligent talent platform 202 to retrieve data objects stored therein.

The semantics of data objects defined in each remote system 218A-218B may vary. This is because the remote systems 218A-218B may be provided by different vendors and each vendor may have its own particular semantics to define data objects. Further, the data objects stored in remote system 218A-218B may be updated from time to time. The updates may include the entry of new data objects relating to new candidates and/or new employees, changes of status or feature values in existing data objects relating to current candidates and/or employees, etc. These variations and changes of data objects stored in remote systems 218A-218B present technical challenges to data synchronization with the intelligent talent platform 202.

Intelligent talent platform 202 may include intelligent talent software applications 210, a data storage to store data objects (including standard data objects 214 and custom data objects 216) according to an extensible data model 212, and an automated synchronization subsystem 206. As discussed above, intelligent talent platform 202 may implement intelligent talent software applications 210 to provide valuable insights into the talent data, the valuable insights including, but not limited to, quantitative metrics or the matching scores to match candidates and positions, highlights on candidate profiles, diversity analytics for diversity hiring goals, organization-wide skill and capability analytics for workforce planning, and talent analytics for recruiting operational excellence. In one implementation, the intelligent talent software applications 210 can be a suite of software applications that include machine learning or neural network modules. The machine learning or neural network modules may have been trained on training data so that the intelligent talent software applications 210 may be deployed to provide the valuable insights into the talent data.

The intelligent talent software applications 210 may require data objects obtained from remote systems as inputs to the machine learning or neural network modules therein. To facilitate operations of the intelligent talent software applications 210, intelligent talent platform 202 may include a data storage to store (or cache) data objects obtained from remote systems 218A-218B. For reasons discussed above, the data objects stored in intelligent talent platform 202 may include discrepancies from the related data objects stored in remote systems 218A-218B because of the constant updates to these data objects by these systems. Further, the format of data objects stored in intelligent talent platform 202 may differ from those stored in remote systems 218A-218B. To maintain complete, consistent, and fresh talent data, intelligent talent platform 202 may include an automated synchronization subsystem 206 to perform data synchronization.

To achieve the completeness of data synchronization, in one implementation, intelligent talent platform 202 may employ an extensible data model 212 to ensure a comprehensive compatibility with different kinds of data objects defined by remote systems 218A-218B. Extensible data model 212 in this disclosure refers to a superset of the data models used by all the remote systems and the data models of the intelligent talent platform's own software products. Extensible data model 212 may provide flexible support to all types of data models including standard data objects 214 and custom data objects 216. Standard data objects 214 can be those data objects that are defined in a data object library of intelligent talent platform 202. Thus, standard data objects 214 are those that are known remote systems 218A-218B and/or intelligent talent platform 202.

For those data objects that are not defined in the data object library, extensible data model 212 may provide custom data objects 216 that allow intelligent talent platform to read an undefined data object from remote systems and output such data objects back to the remote systems. The custom data objects 216 may include user-defined entries, and each entry may include custom identification fields, data type, and data values. In this way, custom data objects 216 may accommodate undefine data objects (e.g., a new data object type). Intelligent talent platform 202 may further implement mappers and transformers of data objects. A mapper may map a data object obtained from the API of a remote system to a standard data object 214 or a custom data object 216. A transformer can be macros that may be executed to extract certain information from a data object and transform the information into one of a standard data object 214 or a custom data object 216. By using the extensible data model 212, automated synchronization subsystem 206 may achieve complete data synchronization.

Automated synchronization subsystem 206 may include further components to achieve consistent and fresh data synchronization. Referring to FIG. 2, automated synchronization subsystem 206 may further include remote system adapters 222A-222B, base adapter 224, data object synchronization handlers 226A-226B, synchronization handler 228, synchronization worker 230, smart scheduler 232, Webhook 234, and robustness subsystem 236. These components may work collaboratively to achieve complete, consistent, and fresh data synchronization for intelligent talent platform 202.

In one implementation, automated synchronization subsystem 206 may include a remote system adapter subsystem which further includes remote system adapters 222A-222B and base adapter 224. For each remote system 218A-218B, automated synchronization subsystem 206 may provide a corresponding remote system adapter 222A-222B. Remote system adapter 222A-222B may include hardware circuit that is configured or programmed to connect to a corresponding remote system 218A-218B for retrieving data objects from the remote system in a first direction of data transmission and/or write data objects from intelligent talent platform to the remote system in a second direction of data transmission. While remote system adapter 222A-222B may include code customized for each corresponding remote system 218A-218B, base adapter 224 may include code that is commonly applicable to all remote systems 218A-218B.

Figure 3:
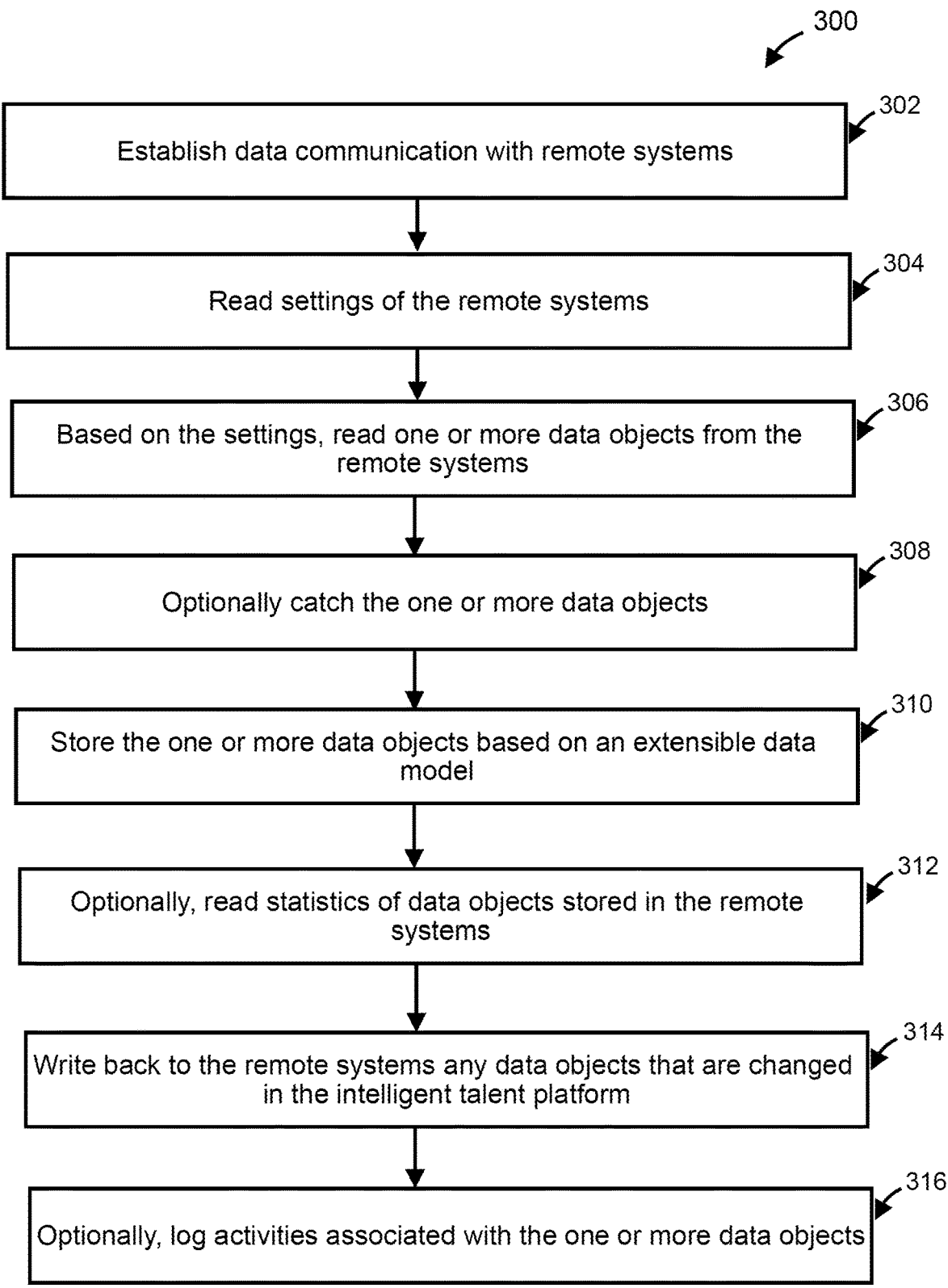
FIG. 3 illustrates operations of the remote system adapter subsystem according to an implementation of the disclosure.

The remote system adapter subsystem may be configured to define intelligent talent platform's data communication with remote systems 218A-218B in the following aspects. The remote system adapter subsystem may include hardware circuit that may be configured to operations relating to interacting with the remote systems 218A-218B. FIG. 3 illustrates operations 300 of the remote system adapter subsystem according to an implementation of the disclosure. Operations 300 may be performed by processing devices that may comprise hardware (e.g., circuitry, dedicated logic), computer readable instructions (e.g., run on a general purpose computer system or a dedicated machine), or a combination of both. For simplicity of explanation, the operations 300 are depicted and described as a series of acts. However, acts in accordance with this disclosure can occur in various orders and/or concurrently, and with other acts not presented and described herein.

Referring to FIG. 3, at 302, the remote system adapter subsystem of automated synchronization system 206 may establish data communication with remote systems 218A-218B. To establish the data communication, the remote system adapter subsystem may initiate the contact with the remote systems 218A-218B using valid credentials (e.g., user identification, password, and two-factor verification), and then maintain the data communication channel on an ongoing basis. In one implementation, the remote system adapter subsystem may be configured with auto-retry in the event of losing the data communication with the remote systems 218A-218B (e.g., restarting the remote systems after the remote systems were shut down for maintenance). In this way, the remote system adapter subsystem may maintain a stable bidirectional data communication channel with remote systems.

At 304, the remote system adapter subsystem may read setting parameters of the remote systems 218A-218B. The setting parameters may include information that is useful for the data communication between the remote system adapter subsystem and remote systems 218A-218B. Examples of setting parameters may include the time zone of the remote system.

At 306, the remote system adapter subsystem may read, based on the setting parameters, one or more data objects from the remote systems 218A-218B. In one implementation, the remote system adapter subsystem may read all the data objects stored in a remote system. Alternatively, the remote system adapter subsystem may read selected data objects according to rules (e.g., modified data objects since last read according to a timestamp, or data objects filtered according a value stored in a field of the data objects such as those data objects whose work experience field is greater than 2 years). The rules are provided by the synchronization subsystem which is described in the following sections. The retrieved data objects can be one-off data objects or a batch of data objects.

At 308, the remote system adapter subsystem may optionally cache the data objects retrieved from remote systems 218A-218B in their native forms. This may save the time to re-fetch them from remote systems 218A-218B.

At 310, the remote system adapter subsystem may store the one or more data objects retrieved from remote systems 218A-218B in a data storage of intelligent talent platform according extensible data model 212. The storing may include map and transform the one or more data objects according to extensible data model 212 into standard data objects 214 and/or custom data objects 216 so that they are in the form that can be used by intelligent talent applications 210.

At 312, the remote system adapter subsystem may optionally read statistics of data objects stored in remote systems 218A-218B. The statistics can be, for example, the number of open job positions in the ATS. The statistics may be used for checking whether there is a need for an update to the data objects stored in the remote systems 218A-218B. For example, the statistics changes between two accesses of the same remote system indicate at least one data object stored in the remote system has been modified, and therefore, a synchronization event may be scheduled.

At 314, the remote system adapter subsystem may write back to the remote systems 218A-218B any data objects (or any fields within the data objects) that have been changed in the intelligent talent platform 202. The write-back may help achieve bidirectional data synchronization so that the data objects stored in the remote systems accurately reflect those stored in the intelligent talent platform 202.

At 316, the remote system adapter subsystem may optionally log activities associated with one or more data objects. The log data may include, for example, the entity (e.g., user id), acts (e.g., read, write), and times (times of acts), etc. The logged activity data may be used for reporting and auditing purposes.

Referring to FIG. 2, intelligent talent platform 202 may include a synchronization subsystem. The synchronization subsystem may include data object synchronization handlers 226A-226B and synchronization handler 228.

Data object synchronization handlers 226A-226B may include hardware circuit configured or programmed to perform data synchronization for a type of data objects. In one implementation, data object synchronization handlers 226A-226B may be constructed according to the type of data objects (e.g., candidate, position, employee, or statistics) that need to be synced. Data objects may be organized according to its type in the data storage. Each type of data objects may be associated with a corresponding data object synchronization handler 226A-226B. Data object synchronization handler 226A-226B is responsible for synchronizing the corresponding type of data objects.

Synchronization handler 228 may include hardware circuit configured or programmed to perform operations relating to data synchronization. In particular, synchronization handler 228 may issue instructions to data object synchronization handlers 226A-226B to synchronize data objects stored in the data storage of intelligent talent platform 202 with data objects stored retrieved from remote systems 204. The synchronization makes data objects stored in the data storage of intelligent talent platform 202 consistent with data objects stored retrieved from remote systems 204. In one implementation, the operations may include composing the rules according to which the remote system adapter subsystem may execute the synchronization of the data objects with remote systems 218A-218B. The rules may include, but not limited to, time range filters (i.e., specifying a time range and the data objects that are changed during the time range are subject to synchronization), data value filters (i.e., a value range for a field of data objects; if the value of the field is within the range, the data object is subject to data synchronization), and a list of data object identifiers (identifiers of data objects subject to synchronization), where the list of data object identifiers can be an individual data object identifier or a batch of data object identifiers.

In one implementation, the operations of synchronization handler 228 may further include determining whether to store full or certain part (e.g., certain fields) of data objects, or delete data objects, where the determination may be based on whether full or only certain part of the data objects are useful to intelligent talent application 210. A data object may be removed from the data storage if the data object is no longer needed.

In one implementation, the operations of synchronization handler 228 may further include determining the latest copy of data objects received from the remote systems and merging the latest copy into the data storage of intelligent talent platform 202. This operation is performed because in a distributed computing architecture, multiple sync handler instances may concurrently read the same data object instance from the remote systems and obtain modified data objects. The latest copy is determined using the last modified timestamp of the data object instance.

In one implementation, the synchronization subsystem may perform automatic detection of data inconsistencies and anomalies. In a distributed computing architecture, the data synchronization may require the detection of data discrepancies between the intelligent talent platform and the remote systems, and/or even within the intelligent talent platform. The discrepancies may include the data value difference for the same data object stored in different systems or other types of discrepancies. To this end, the synchronization subsystem may provide further components to achieve fast and efficient detection of data inconsistencies and anomalies.

Figure 4:
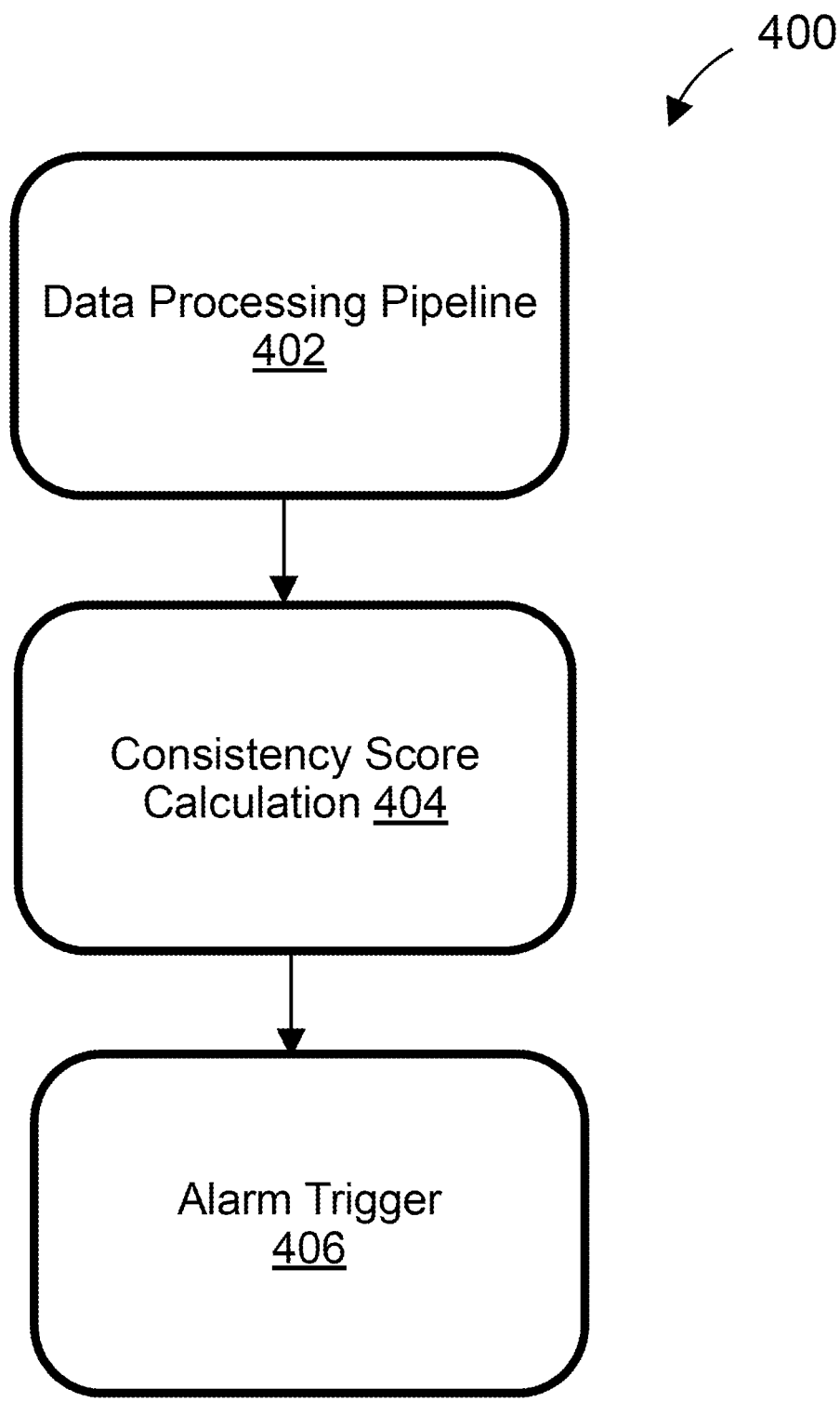
FIG. 4 illustrates a synchronization subsystem including components to detect data inconsistencies and anomalies according to an implementation of the disclosure.

FIG. 4 illustrates a synchronization subsystem 400 including components to detect data inconsistencies and anomalies according to an implementation of the disclosure. Referring to FIG. 4, synchronization subsystem 400 may include a data processing pipeline 420, a consistency score calculation component 404, and an alarm trigger 406. Data processing pipeline 402 may include hardware circuit configured to process data in a series of operations. In one implementation, data processing pipeline 402 may compute raw metrics for data objects stored in the intelligent talent platform and compute the same metric for data objects stored in the remote systems at a regular cadence while automatically throttling the computational load on the remote systems. The metrics may include high-level metrics and low-level metrics. Examples of high-level metrics include the count of open positions, new applications, and hires. Examples of lower-level metrics include count of job application stages or other fields of data object instances. The same metrics are computed for the remote systems by using API exposed by the remote system as follows. For example, to get the count of hires in the remote systems over last one hour, the data processing pipeline 402 can:

a. query the remote system API for candidate applications with hired status and a last activity with a timestamp of no more than an hour old (timestamps are expressed in seconds or milliseconds that have elapsed since Jan. 1, 1970 midnight UTC);

b. when the remote system API responds with a success code (e.g., HTTP 200), extract from the API response the count of hired candidates within the last hour;

c. store the count of hired candidates provided in the API response and the time duration over which they were hired, in this case one hour prior to the request being made into the database of the intelligent talent platform;

d. repeat regularly (e.g., every half hour) or more frequently if the remote system has remaining API rate limit as specified by the HTTP X-Ratelimit-Remaining header. If the remote system responds with a busy indicator (e.g., HTTP 429 response code), then throttle this automatically and retry using a common exponential backoff retry algorithm until the remote system API returns the counts.

Consistency score calculation component 404 may calculate consistency scores for data objects. An example consistency score can be calculated for a given data object such as job position, candidate, application, employee, etc. The score indicates whether the value stored in the remote system is consistent with the value stored in the intelligent talent platform. For example, if they are the same, they are consistent; if they are not the same, they are not consistent. The consistency scores can also be computed according to segments such as remote system type, enterprise account, location of job position, or other data object attributes. For these segments, the consistency score can be calculated based on a simple average, a weighted average to ensure weight consistency of most important fields is supported, or other suitable statistic metrics of values in the segment.

Alarm trigger 406 may generate an alarm in response to determining that the consistency scores are outside of threshold values. The actions taken on the alarms include the automated synchronization, smart alerts to relevant human users, and replays triggered by human users as described in the following.

In one implementation, automated synchronization subsystem 206 may provide smart alerts to users in response to detecting certain types of errors. Certain types of errors during data synchronization may require human user input and/or intervention. Examples of errors may include expiration of credentials to remote systems, accidental revocation of granted permissions to remote systems for accessing the intelligent talent platform, or a user having only an account on the intelligent talent platform but not on a remote system. In these cases, the automated synchronization subsystem may generate alerts to the relevant manager user (e.g., the administrator, the recruiter, the employee, or the external applicant) of the intelligent talent platform. The alerts may include human interpretable information about the error and instructions on how to rectify the error.

In response to receiving the alerts (e.g., via e-mails or text messages), the manager user may replay reads from remote systems to get the latest copy of the data objects from the remote systems. The manager user can also be notified when writes to the remote system failed. For example, when external candidates submit a job position moments before the job position closes, the remote system may disallow the write, thus resulting in a write fail. The human user has the ability to manually open the position in the remote system and replay the application submission on behalf of the candidates.

Referring to FIG. 2, automated synchronization subsystem 206 may further include a scheduler 232 and synchronization worker 230, where scheduler 232 may generate events based on a schedule and synchronization worker 230 may execute operations in response to these events. In one implementation, scheduler 232 can be a program that may generate synchronization events based on a schedule. For example, scheduler 232 may generate synchronization triggers at defined time intervals for bidirectional synchronization between the intelligent talent platform and the remote systems. The generated synchronization schedule may include different types of synchronization events based on the types of changes to the data objects. For example, in one implementation, the synchronization frequency (e.g., times/day) may vary based on the types of data objects (e.g., job position data object or candidate profile data object) or the types of operations on the data objects (e.g., modification or creation of a data object). Automated synchronization subsystem 206 may provide a user interface including, for example, dropdown box for user to select types of data objects, types of operations, and frequencies of synchronization to create a schedule of synchronization.

Synchronization worker 230 can be a program running on the intelligent talent platform 202 that executes synchronization events according to the synchronization schedule generated by scheduler 232. Synchronization worker 230 may check to ensure that synchronization permission is enabled for the remote systems, determine whether to read from or write to the remote systems, manage the frequencies of synchronization with each remote system, invoke synchronization handler 228 to perform the synchronization, and log the results of the sync operation.

In some scenarios, the data objects stored in remote systems may be updated (e.g., modification of talent profiles) at the remote systems, thereby causing discrepancies between the data objects stored in the remote systems and those in the intelligent talent platform. For such scenarios, intelligent talent platform 202 may implement Webhook 234 which is a callback generated by the remote systems to the intelligent talent platform in response to the remote systems detecting an update to the data objects stored therein. A Webhook notification may be generated and transmitted by the remote system to the intelligent talent platform to notify about changes in data objects stored therein. These notifications may cause scheduler 232 to generate a scheduled synchronization event for synchronization worker 230. The scheduled synchronization event when executed may cause data synchronization between remote systems and the intelligent talent platform.

Correspondingly, implementations of the disclosure may provide writeback instant or bulk for updates to data objects stored in the intelligent talent platform. Writeback instant or writeback bulk can be performed by the intelligent talent platform when a user makes changes in the intelligent talent platform to one data object or multiple data objects respectively and causes these changes to be written back to the remote system. Changes to one data object may be written back immediately. Changes to multiple data objects may be performed by writing one data object immediately and queueing the rest for background processing. The reason to write the change to one data object immediately is to ensure that the write succeeds. If the write fails, then the error is immediately presented to the manager user so that the manager user can rectify the error. For example, if the remote system has revoked the permission to make this change to the data objects, then the manager user may need to update the permission in the remote system first before making the bulk change. In a specific example, when a manager user advances 20 applicants in a workflow, a first applicant may be advanced first while the other 19 are queued for advancement.

Figure 5:
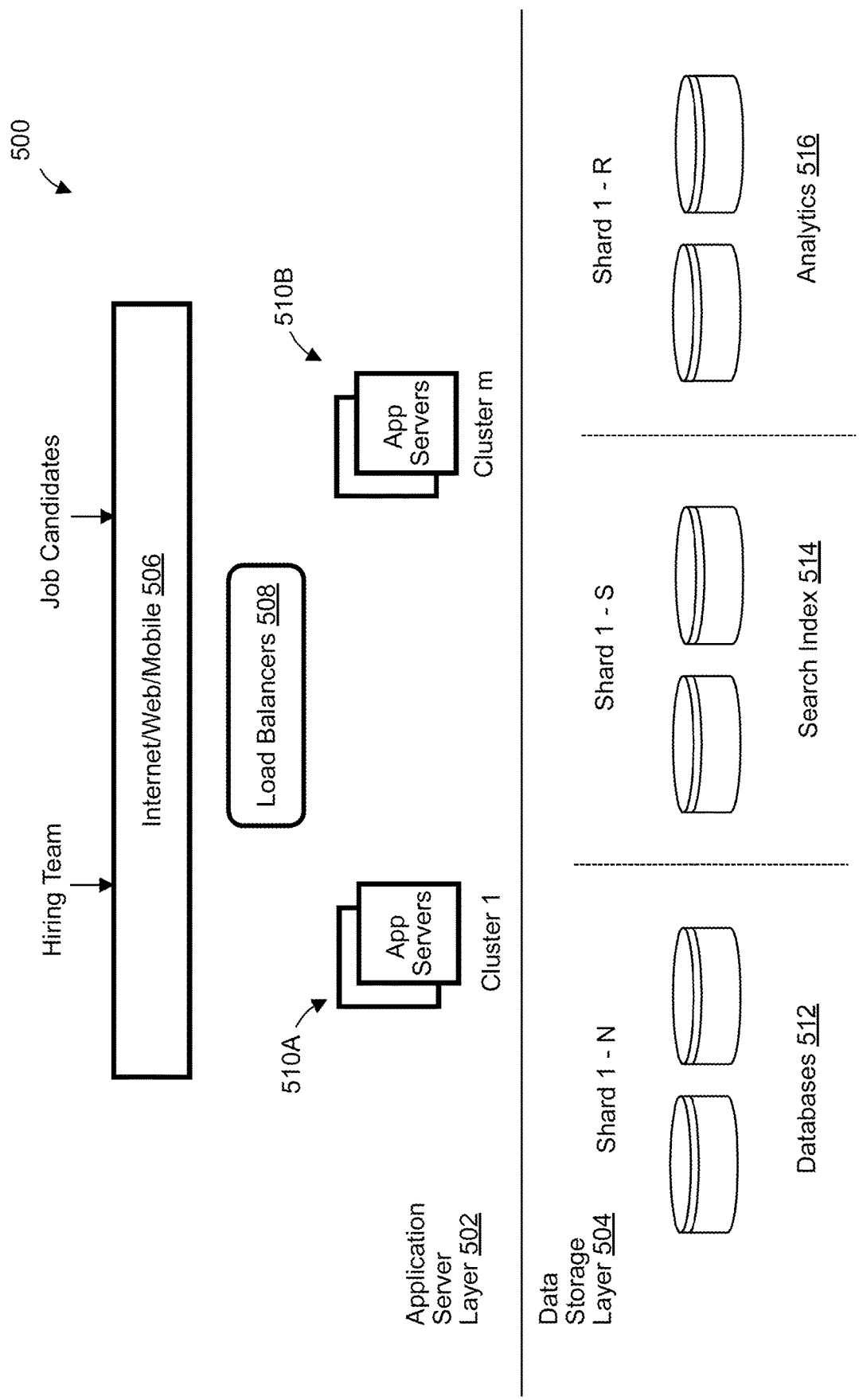
FIG. 5 illustrates an intelligent talent platform implemented on a scalable computing infrastructure according to an implementation of the disclosure.

The intelligent talent platform may be implemented on a scalable computing infrastructure to provide further flexibility to data synchronization. FIG. 5 illustrates an intelligent talent platform implemented on a scalable computing infrastructure 500 according to an implementation of the disclosure. As shown in FIG. 5, the scalable intelligent talent platform may include an application server layer 502 and a data storage layer 504. Application server layer 502 may include clusters of application servers 510A-510B on which the intelligent talent platform may be implemented and/or distributed. Application server layer 502 may include user devices 506 (e.g., computers or mobile phones) through which users (e.g., hiring team members, job candidates) may access the intelligent talent software applications supported by the intelligent talent platform. Application server layer 502 may include one or more load balancers to manage the workloads on different clusters of application servers 510A-510B.

Data storage layer 504 may include a first cluster of storages for storing databases 512, a second cluster of storages for storing a search index 514 that may be used to search databases 512 based on queries, and a third cluster of storages for storing analytics of the contents stored in databases 512. Databases 512 may store data objects according to the extensible data model. Search index 514 may be a data structure that a search engine may refer to when searching for data objects in response to a query. For example, the query can be a job title, and the results can be the talent profiles of qualified candidates for the job title. Analytics 516 may include statistics derived from contents in databases 512. Examples of analytics 516 may include current open job positions, current active applicants for a particular job opening, etc. The data storage layer 504 may achieve scalability using multiple shards (a shard is a horizontal partition in a database or search engine) for each of the database, search, and analytics; each shard supports one or more customer accounts. Thus, multiple customer accounts may be implemented across the data storage layer 504.

Implementations of the disclosure may use auto-provision queues and schedules to achieve further scalability of data synchronization. In one implementation, whenever a new customer account is signed up, an estimate of the count of data objects (e.g., candidates and job positions) is determined using data provided with at the sign-up of the customer account or using estimates from publicly available data on the customer. As part of the ongoing maintenance as the customer account grows its count of data objects, to enhance user experience, synchronizations of currently modified data objects are performed according to a priority queue. Synchronizations of high priority data objects are performed more frequently compared to the synchronization of historical data objects. Auto-provision queue and schedule may allow spikes in bidirectional synchronization to occur for special situations such as when there is heightened interest in a company's job positions.

In one implementation, the modifications to data objects occurred on the remote systems may be detected by multiple synchronization workers running on a scalable intelligent talent platform using a scalable computing infrastructure. The modifications to the data objects may be associated with different priorities based on the types of the data objects and/or the types of modifications. For such scenarios, implementations of the automated synchronization subsystem may provide precision synchronization. In one implementation, the synchronization handler may identify the precise set of data objects that have been modified. The set of data objects can be stored in the remote systems or in a data storage of the intelligent talent platform. In a scalable distributed computing infrastructure, different synchronization handler instances may identify the same data object as having been modified, resulting in duplicated modified data objects. Therefore, synchronization handlers may further remove any duplicates of data objects within a given time window. Among the set of modified data objects free of duplicates, the synchronization handlers may identify those with high-priority modifications based on predetermined priority rules. For example, a change to a candidate's active job application may have a higher priority than a change to an inactive dispositioned application from some time duration in the past. In some implementation, the determination of the priority may be carried out using a learning algorithm described below. The scheduler may schedule the data objects with higher priority modifications on a high priority queue and on a more frequent synchronization schedule. Those with lower priority modifications can be placed on a low priority queue or synchronized at off-peak hours.

Machine learning may be used to identify a correct time duration for modifying data objects based on the historical data or past experience. The problem to be solved is that some inactive dispositioned candidate applications may be modified for important reasons such as adding the employee ID upon hiring, which may be done a few weeks or months after the application has been made inactive and dispositioned. Thus, the automated synchronization subsystem may predict the priority associated with modifications to data objects using a machine learning method.

Figure 6:
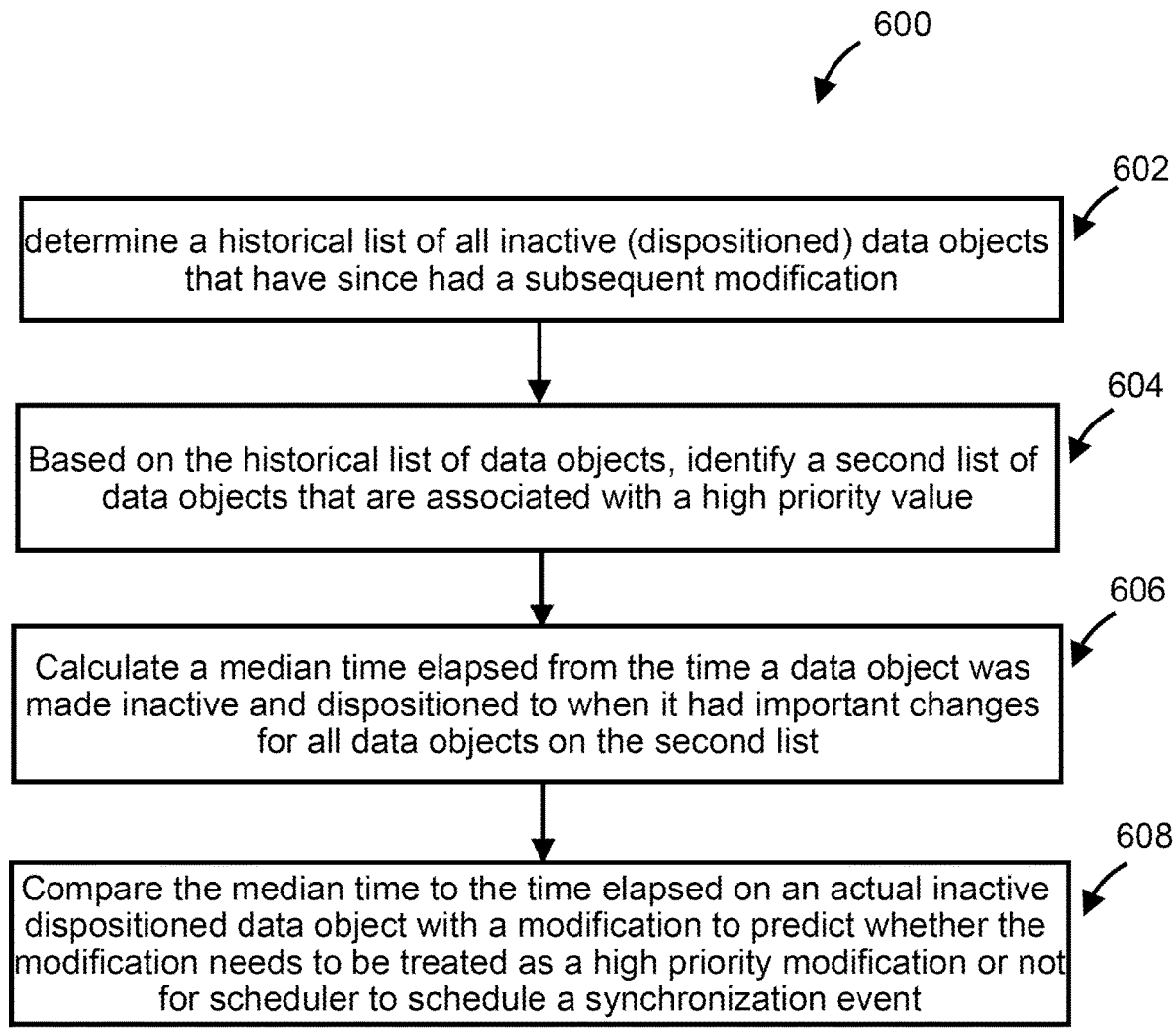
FIG. 6 illustrates a flowchart of a method for using machine learning to predict priority associated with modifications according to an implementation of the disclosure.

FIG. 6 illustrates a flowchart of a method 600 for using machine learning to predict priority associated with modifications to data objects according to an implementation of the disclosure. Method 600 may be performed by processing devices that may comprise hardware (e.g., circuitry, dedicated logic), computer readable instructions (e.g., run on a general purpose computer system or a dedicated machine), or a combination of both. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 6, at 602, one or more processing devices may determine a historical list of all inactive (or dispositioned) data objects that have since had a subsequent modification. The historical list may include data objects representing applications submitted during a relevant historical time period such as the last 12 months (or multiples of this to account for seasonality in job applications).

At 604, based on the historical list of data objects, one or more processing devices may identify a second list of data objects that are associated with a high priority value. The high priority value may be assigned based on the type of the data objects and the type of modification to the data object. For example, a creation of a new data object may be assigned a first high priority value, and a change of candidate status (e.g., from applicant to hire) may be assigned a second high priority value.

At 606, one or more processing devices may calculate a median time elapsed from the time a data object was made inactive and dispositioned to when it had important changes for all data objects on the second list.

At 608, one or more processing devices may compare the median time to the time elapsed on an actual inactive dispositioned data object with a modification to predict whether the modification needs to be treated as a high priority modification or not for scheduler to schedule a synchronization event.

The above analysis and prediction steps are performed for data objects for each customer account, and are also extensible to sub organization (e.g., a department) within a customer account. Further, implementations may provide recalculation of the medians periodically such as on a monthly basis to learn any changes in the medians.

Although method 600 is discussed in the context of median time elapsed from inactive disposition to modification again, the method is a non-limiting example for the candidate application data object. Similar methods may be applicable to other data model objects. The system is designed to flexibly substitute the median comparison algorithms with supervised machine learning algorithms.

In one implementation, the automated synchronization subsystem may be configured with data volume and/or rate caps on data transmission to the remote systems. These volume and rate caps assigned to the remote systems may be complied by detecting a busy notification (e.g., HTTP 429) from the remote systems and downsizing of synchronization workers that may be assigned to process synchronization tasks from the message queue.

The remote systems may expose API to access data objects stored in the remote system. The API are accessed over HTTP and typically limit the volume of data objects accessed over a time period such as a day, and limit the rate at which the intelligent talent platform can make requests to the remote system API over a time period such as 60 seconds. When the limits are reached, the remote system responds with error codes such as an HTTP 429 error code, or "Export size too large" or "Export too many records" error codes when the talent intelligence platform makes too many requests within a minute or requests more data object volume than allowed per day, respectively. The system then downsizes the number of active synchronization workers, which are described earlier, to reduce the number of requests or to even stop making the request to the remote system API.

The automated synchronization subsystem may be configured with auto-shut off the data synchronization. The automated synchronization subsystem may auto-shut off the read from and the write into the remote system when the remote system is down for scheduled maintenance, or is unresponsive. In cases when the remote system has not granted a specific permission to read or write, the intelligent talent platform may perform a precise auto-shut off operation on the specific read or write.

In one implementation, automated synchronization subsystem 206 may further include a robustness subsystem 236 which may ensure that the data platform can automatically and gracefully handle the errors that can occur in a distributed computing architecture with a remote system. The robustness subsystem 236 may provide automated probes for connectivity and permissions. For example, connectivity is broken when credentials are incorrectly entered at the start, or credentials expire after a certain amount of time, or the permissions granted to intelligent talent platform by the remote system administrator are deliberately or accidentally revoked. Therefore, the probes may determine whether the intelligent talent platform has the proper permissions to access the remote systems to achieve data synchronization. A user may enter a probe through a probe user interface, and the results of the probe may be reported through a list of remote systems and the permissions associated with these remote systems.

The robustness subsystem 236 may further provide semantic understanding of common issues and implication on use cases (e.g., scheduled downtimes, permissions, workflow changes, and rate limits). For example, downtime error messages are reported in different ways by remote systems.

The robustness subsystem 236 may further provide validation rules for writing changes to data objects into the remote system and validation rules for storing changes to data objects made in the remote system. An example is the validation of last modified timestamps of the data object instance and its fields.

The robustness subsystem 236 may further enable recovery of accidentally corrupted data objects by first recording a stream of all changelogs to data object instances, tools to view the changelogs, and tools to manually rollback changes to a specific snapshot and then retry the read or write to the remote system.

Figure 7:
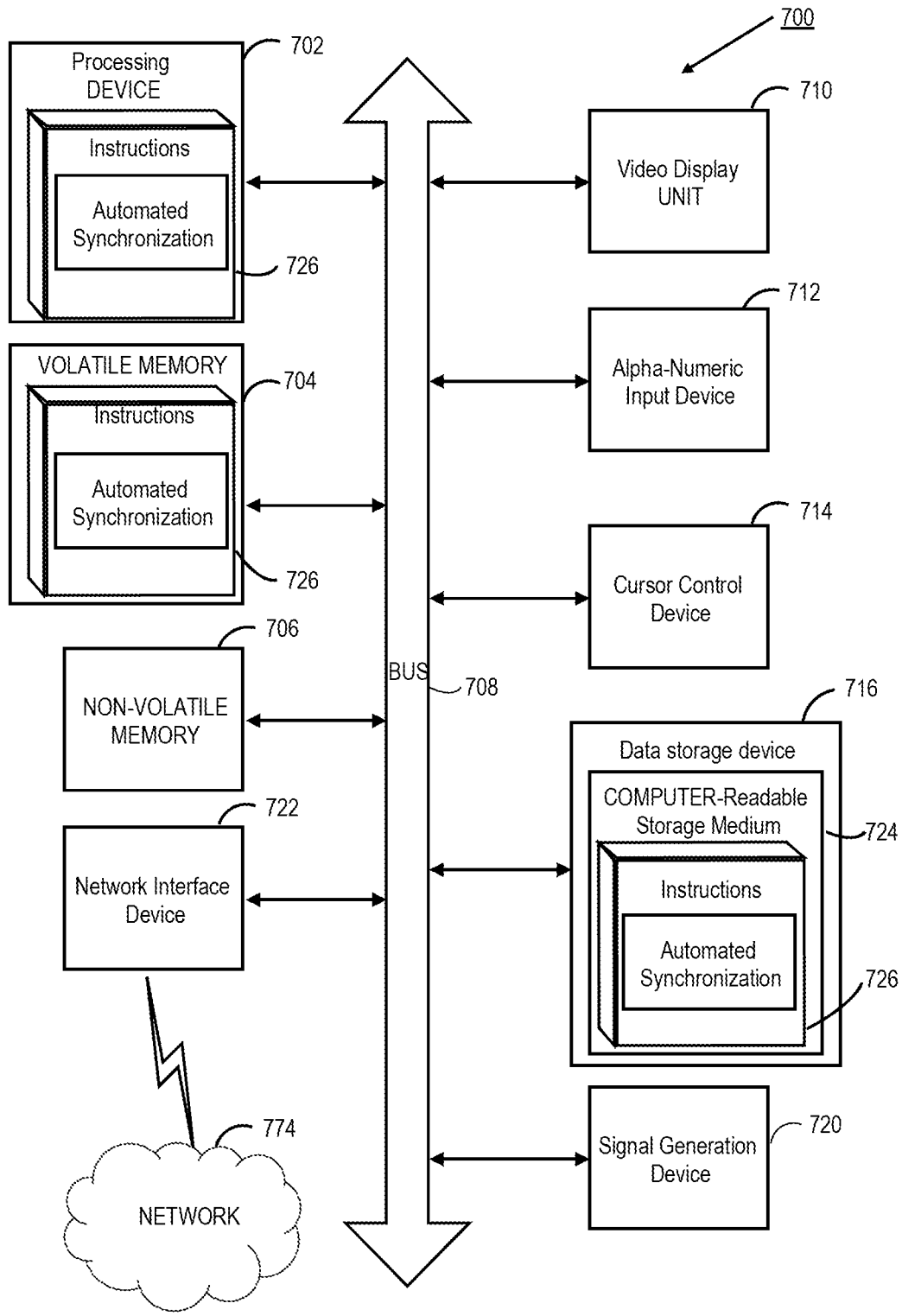
FIG. 7 depicts a block diagram of a computer system operating in accordance with one or more aspects of the present disclosure.

FIG. 7 depicts a block diagram of a computer system 700 operating in accordance with one or more aspects of the present disclosure. In various illustrative examples, computer system 700 may implement operations providing an intelligent talent platform 202 including automated synchronization subsystem 206 as shown in FIG. 2.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for providing intelligent talent platform 202 of FIG. 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising one or more processing devices and one or more storage devices for storing instructions that when executed by the one or more processing devices to implement an automated synchronization system for an intelligent talent platform, the automated synchronization system comprising:
   one or more remote system adapters, each of the one or more remote system adapters being communicatively coupled to a corresponding remote system, to retrieve one or more first data objects containing information relating to managing talents;
   a synchronization handler to:
      obtain, based on identification features of the one or more first data objects, one or more second data objects from a storage device associated with the intelligent talent platform;
      calculate a consistency score based on values in the one or more first data objects and values in the one or more second data objects; and
      responsive to determining that the one or more first data objects comprise modifications from the one or more second data objects based on the consistency score, determine priority values associated with the modifications to the one or more first data objects based on historical modification activities to the one or more first data objects, wherein to determine the priority values based on historical modification activities to the one or more first data objects, the synchronization handler is further to:
         determine the historical modification activities comprising a list of inactive and dispositioned first data objects that have since had a subsequent modification;
         calculate a corresponding statistic metric for each first data object in the list based on a time elapsed from a first data object in the list made inactive and dispositioned to when the first data object had a modification; and
         calculate a corresponding priority value for each of the first data objects based on a comparison between a statistic metric of the first data object with the corresponding statistic metric calculated for each of the first data objects in the list;
   a scheduler to generate a synchronization schedule based on the priority values; and
   a synchronization worker to execute data synchronization between the one or more first data objects and the one or more second data objects in accordance with the synchronization schedule.

2. The system of claim 1, wherein the remote systems communicatively coupled to the one or more remote system adapters comprise at least one of an Applicant Tracking System (ATS) or a Human Resource Information System (HRIS).

3. The system of claim 1, wherein each of the remote systems comprises an application programming interface (API), and wherein to retrieve one or more first data objects containing information relating to managing talents, each of the one or more remote system adapters is to:
   initiate a communication contact with the corresponding remote system;
   read a setting parameter of the corresponding remote system;
   retrieve, based on the setting parameter, at least one first data object from the corresponding remote system; and
   map and store the at least one first data object according to an extensible data model.

4. The system of claim 3, wherein to retrieve, based on the setting parameter, at least one first data object from the corresponding remote system, each of the one or more remote system adapters is to one of:
   retrieve all data objects from the corresponding remote system; or
   retrieve selected data objects from the corresponding remote system based on a retrieval rule generated by the synchronization handler, wherein the retrieval rule specifies a retrieval criteria comprising at least one of a modification time or a value for a field in a data object.

5. The system of claim 1, wherein the one or more first data objects and the one or more second data objects are specified according to an extensible data model, and wherein the extensible data model comprises:
   a standard data object type that is defined in a data object library, wherein the data object library comprises predetermined data object types of data objects stored in the remote systems and in the storage device associated with the intelligent talent platform; and
   a custom data object type that comprises user-defined entries comprising a custom identification type, a data type, and a data value.

6. The system of claim 1, wherein in response to determining that the consistency score is outside a predetermined range of value, the synchronization handler is further to generate an alarm for triggering an automatic data synchronization between the intelligent talent platform and the remote systems or to a generate an alarm notice to a user for intervention by the user.

7. The system of claim 1, wherein to determine priority values associated with the modifications to the one or more first data objects, the synchronization handler is to determine the priority values based on at least one of a type of the modifications or a type of the one or more first data objects.

8. The system of claim 1, wherein to determine the priority values using a machine learning model that is trained based on historical modification activities to the one or more first data objects, the synchronization handler is to:
   identify, based on the list of first data objects, a second list of first data objects that are associated with a high priority value, wherein the high priority value is determined based on a data object type;
   calculate a statistic metric for each first data object in the second list based on a time elapsed from a first data object in the second list made inactive and dispositioned to when the first data object in the second list had a modification; and
   calculate the priority value for a first data object based on a comparison between a statistic metric of the first data object with the statistic metric calculated for the first data objects in the second list.

9. The system of claim 1, wherein the automated synchronization system further implements a webhook to receive a notification generated by one of the remote systems in response to detecting a modification of data objects stored in the one of the remote systems, and wherein in response to receiving the notification, the webhook is to generate an alarm for triggering an automatic data synchronization between the intelligent talent platform and the remote systems or to a generate an alarm notice to a user for intervention by the user.

10. The system of claim 1, wherein the automated synchronization system further includes a robustness subsystem to:
    periodically transmit a probe to each of the remote systems to determine connectivity and access permission between the intelligent talent platform and the remote systems;
    validate, based on a validation rule, a writeback of data objects to the remote systems; or
    recover, based on a changelog, corrupted data objects stored in the storage device of the intelligent talent platform.

11. The system of claim 1, wherein the intelligent talent platform is implemented on a scalable infrastructure comprising an application server layer and a data storage layer, wherein the application server layer comprises clusters of application servers and a load balancer, and the data storage layer comprises a data object database for storing data objects, a search index for searching data objects, and an analytics database for storing analytics, and wherein the data storage layer is organized according to shards, each shards being associated with a corresponding customer.

12. A method for performing data synchronization using automated synchronization subsystem of an intelligent talent platform, the method comprising:
    receiving, by one or more remote system adapters each being communicatively coupled to a corresponding remote system, one or more first data objects containing information relating to managing talents;
    obtaining, by a synchronization handler based on identification features of the one or more first data objects, one or more second data objects from a storage device associated with the intelligent talent platform;
    calculating, by the synchronization handler, a consistency score based on values in the one or more first data objects and values in the one or more second data objects;
    responsive to determining that the one or more first data objects comprise modifications from the one or more second data objects based on the consistency score, determining, by the synchronization handler, priority values associated with the modifications to the one or more first data objects based on historical modification activities to the one or more first data objects, wherein determining the priority based on historical modification activities to the one or more first data objects further comprises:
        determining the historical modification activities comprising a list of inactive and dispositioned first data objects that have since had a subsequent modification;
        calculating a corresponding statistic metric for each first data object in the list based on a time elapsed from a first data object in the list made inactive and dispositioned to when the first data object had a modification; and
        calculating a corresponding priority value for each of the first data objects based on a comparison between a statistic metric of the first data object with the corresponding statistic metric calculated for each of the first data objects in the list;
    generating, by a scheduler, a synchronization schedule based on the priority values; and
    executing, by a synchronization worker, data synchronization between the one or more first data objects and the one or more second data objects in accordance with the synchronization schedule.

13. The method of claim 12, wherein the remote systems communicatively coupled to the one or more remote system adapters comprise at least one of an Applicant Tracking System (ATS) or a Human Resource Information System (HRIS).

14. The method of claim 12, wherein each of the remote systems comprises an application programming interface (API), and wherein retrieving one or more first data objects containing information relating to managing talents further comprises:
    initiating a communication contact with the corresponding remote system;
    reading a setting parameter of the corresponding remote system;
    retrieving, based on the setting parameter, at least one first data object from the corresponding remote system; and
    mapping and storing the at least one first data object according to an extensible data model.

15. The method of claim 14, wherein retrieving, based on the setting parameter, at least one first data object from the corresponding remote system further comprises:
    retrieving, by each of the one or more remote system adapters, all data objects from the corresponding remote system; or
    retrieving, by each of the one or more remote system adapters, selected data objects from the corresponding remote system based on a retrieval rule generated by the synchronization handler, wherein the retrieval rule specifies a retrieval criteria comprising at least one of a modification time or a value for a field in a data object.

16. The method of claim 12, wherein the one or more first data objects and the one or more second data objects are specified according to an extensible data model, and wherein the extensible data model comprises:
- a standard data object type that is defined in a data object library, wherein the data object library comprises predetermined data object types of data objects stored in the remote systems and in the storage device associated with the intelligent talent platform; and
- a custom data object type that comprises user-defined entries comprising a custom identification type, a data type, and a data value.

17. The method of claim 12, further comprising in response to determining that the consistency score is outside a predetermined range of value, generating an alarm for triggering an automatic data synchronization between the intelligent talent platform and the remote systems or to a generate an alarm notice to a user for intervention by the user.

18. The method of claim 12, wherein determining priority values associated with the modifications to the one or more first data objects comprises:
  determine the priority values based on at least one of a type of the modifications or a type of the one or more first data objects.

19. The method of claim 18, wherein determining the priority values using a machine learning model that is trained based on historical modification activities to the one or more first data objects further comprises:
- identifying, based on the list of first data objects, a second list of first data objects that are associated with a high priority value, wherein the high priority value is determined based on a data object type;
- calculating a statistic metric for each first data object in the second list based on a time elapsed from a first data object in the second list made inactive and dispositioned to when the first data object in the second list had a modification; and
- calculating the priority value for a first data object based on a comparison between a statistic metric of the first data object with the statistic metric calculated for the first data objects in the second list.

* * * * *